US008516094B2

(12) United States Patent
Yang

(10) Patent No.: US 8,516,094 B2
(45) Date of Patent: Aug. 20, 2013

(54) METHOD AND NETWORK MANAGEMENT APPARATUS FOR IMPLEMENTING INFORMATION SERVICE LEVEL INHERITANCE IN NETWORK MANAGEMENT SYSTEM

(75) Inventor: Li Yang, Guangdong (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 577 days.

(21) Appl. No.: 11/772,308

(22) Filed: Jul. 2, 2007

(65) Prior Publication Data
US 2008/0052385 A1 Feb. 28, 2008

Related U.S. Application Data

(63) Continuation of application No. PCT/CN2006/002073, filed on Aug. 15, 2006.

(30) Foreign Application Priority Data

Aug. 20, 2005 (CN) .......................... 2005 1 0091286

(51) Int. Cl.
G06F 15/173 (2006.01)
(52) U.S. Cl.
USPC .......................................... 709/223; 709/226
(58) Field of Classification Search
USPC .................................................. 709/223, 226
See application file for complete search history.

(56) References Cited

U.S. PATENT DOCUMENTS

| 7,159,224 | B2* | 1/2007 | Sharma et al. | 719/310 |
| 7,246,358 | B2* | 7/2007 | Chinnici et al. | 719/315 |
| 7,424,722 | B2* | 9/2008 | Joseph | 719/330 |
| 7,530,081 | B2* | 5/2009 | Joseph | 719/330 |
| 7,882,131 | B2* | 2/2011 | Kim | 707/781 |
| 2003/0191803 | A1* | 10/2003 | Chinnici et al. | 709/203 |
| 2003/0204645 | A1* | 10/2003 | Sharma et al. | 709/328 |
| 2003/0220925 | A1* | 11/2003 | Lior | 707/10 |
| 2005/0050299 | A1* | 3/2005 | Joseph | 712/1 |

(Continued)

FOREIGN PATENT DOCUMENTS

| EP | 1551129 A2 | 7/2005 |
| WO | 2005060203 A1 | 6/2005 |
| WO | 2005065008 A2 | 7/2005 |

OTHER PUBLICATIONS

European Search Report—PCT/CN2006002073—dated Jan. 24, 2008.

(Continued)

Primary Examiner — Aaron Strange
Assistant Examiner — Jonathan Bui
(74) Attorney, Agent, or Firm — Huawei Technologies Co., Ltd

(57) ABSTRACT

A method for implementing Information Service (IS) level inheritance in a network management system includes: defining a WSDL file for an inheriting IRP, including the base management operations of the base IRP in the WSDL file for the inheriting IRP during the defining action to establish the IS level inheritance between the inheriting IRP and the base IRP; implementing conversion between a base management operation message and a SOAP format message according to the IS level inheritance. Apparatuses and other methods for implementing IS level inheritance are disclosed as well. The solution enables the inheriting IRP module of the network management apparatus to correctly execute the base management operation by establishing the IS level inheritance between the inheriting IRP and the base IRP, which meets the IS level description requirement of the IRP.

14 Claims, 4 Drawing Sheets

(56) References Cited

U.S. PATENT DOCUMENTS

| | | | |
|---|---|---|---|
| 2005/0050555 A1* | 3/2005 | Exley et al. | 719/328 |
| 2005/0198320 A1* | 9/2005 | Chou et al. | 709/228 |
| 2006/0015617 A1* | 1/2006 | Castro et al. | 709/226 |
| 2007/0055676 A1* | 3/2007 | Kim | 707/10 |
| 2007/0061277 A1* | 3/2007 | Boden et al. | 707/1 |
| 2008/0147838 A1* | 6/2008 | Hirsch | 709/223 |
| 2008/0250224 A1* | 10/2008 | Joseph | 712/1 |

OTHER PUBLICATIONS

"Digital cellular telecommunications system (Phase 2+); Universal Mobile Telecommunications System (UMTS); Telecommunications management; Integration Reference Point (IRP) Concept and definitions (3GPP TS 32.150 version 6.2.0 Release 6); ETSI TS 132 150" ETSI Standards, European Telecommunications Standards Institute, Sophia-Antipo, FR, vol. 3-SA5, No. V620, Dec. 2004, XP014028013.

"Telecommunications and Internet Converged Services and Protocols for Advanced Networking (TISPAN); NGN management; OSS Architecture Release 1; ETSI TS 188 001" ETSI Standards, European Telecommunications Standards Institute, Sophia-Antipo, FR, vol. TISPAN, No. V111, 2005, XP014030092.

D. Andresen: "Enhancing Cluster Application Performance via Smarter Scheduling and Stronger SOAP" Parallel and Distributed Processing Symposium, 2005. Proceedings. 19$^{th}$ IEEE International Denver, CO, USA Apr. 4-8, 2005, Piscataway, NJ USA, IEEE, pp. 218b-218b XP010785795.

"Universal Mobile Telecommunications System (UMTS); Telecommunication management; Architecture (3GPP TS 32.102 version 5.6.0 Release 5); ETSI TS 132 102" ETSI Standards, European Telecommunications Standards Institute, Sophia-Antipo, FR, vol. 3-SA5, No. V560, Mar. 2004, XP014017447.

\* cited by examiner

METHOD AND NETWORK MANAGEMENT APPARATUS FOR IMPLEMENTING INFORMATION SERVICE LEVEL INHERITANCE IN NETWORK MANAGEMENT SYSTEM

FIELD OF THE INVENTION

The present invention relates to the network management technology, and more particularly, to methods and network management apparatuses for implementing information service level inheritance in a network management system.

BACKGROUND OF THE INVENTION

The Third Generation Partnership Project Services and System Aspects Work Group 5 (3GPP SA5) calls the interface between Network Management System (the managing unit) and Network Element Management unit or Network Element (the managed unit) as North bound Interface (Itf-N) in 3G network management. The Itf-N is as shown in FIG. 1 and FIG. 2; the managed unit shown in FIG. 1 is a Network Element Management unit, and the managed unit shown in FIG. 2 is a Network Element.

The Itf-N includes a series of Integration Reference Point (IRP). Any management information on the Itf-N is modeled to be IRP, i.e. the IRP is a set of network management information model depicting the management function and the management data. Information depicting the management function is represented by function IRP, and function IRP includes a set of management operations.

The 3GPP SA5 depicts the IRP using a three-level protocol. Level 1 describes the IRP requirement; Level 2 describes the IRP abstract object model, i.e. Information Service (IS); Level 3 describes the IRP solution for implementing protocol, for example, the Common Object Request Broker Architecture/Interface Definition Language (CORBA/IDL) solution, the Common Management Information Protocol/Common Management Information Service (CMIP/CMISE) solution, and the Web Services Description Language/Simple Object Access Protocol (WSDL/SOAP) solution (SOAP is just a symbol and not limited by the definition of the "Simple Object Access Protocol" in the SOAP 1.2 and its upgraded version). All the solutions provided by Level 3 are based on the existing Level 1 description and Level 2 description.

In the existing art, Level 2 (IS level) of IRP defines the Information Service (IS) level inheritance between the inheriting IRP and the base IRP, and the IS level inheritance indicates that the inheriting object has all the characteristics of the inherited object. For example, referring to FIG. 3 which illustrates the IS level inheritance, the IRP directed by the arrowheads is an abstract function IRP (ManagedGenericIRP) functioning as the base IRP; and the abstract function IRP defines a set of management operations of network management system; all the instantiable function IRPs are the inheriting IRPs which inherit the ManagedGenericIRP. After the IS level inheritance between an inheriting IRP and a base IRP is established, the inheriting IRP can perform the base management operations defined by the base IRP. At the same time, the inheriting IRP may also define specific management operations of the inheriting IRP as required.

The base management operations are a set of management operations inherited from the base IRP by the inheriting IRP in the IS level inheritance. The inheriting IRP may inherit different base IRPs which have different management operations, so the base management operations inherited by the inheriting IRP may be different. Different base IRPs may be defined in such network management systems as 3GPP, WIMAX and NGN as required, which will not be detailed here.

The inheriting IRP defined by the 3GPP SA5 includes: BasicCMIRP, BulkCMIRP, NotificationIRP, TestManagementIRP, Performance Management IRP (PMIRP), Entry Point IRP (EPIRP), Communication Surveillance IRP (CSIRP), AlarmIRP, NotificationLogIRP, File Transfer IRP (FTIRP) and Subscription Management IRP (SuMIRP) etc.

The inheriting IRP is not limited to the above enumerative types, and all the function IRPs defined by such network management systems as 3GPP, WIMAX and NGN belong to the inheriting IRP.

The WSDL/SOAP solution defined by the 3GPP SA5 currently will become a standard of network management. IRPManager and IRPAgent use SOAP v1.1 and WSDL v1.1 as the communication protocols in WSDL/SOAP solution. Services implemented by WSDL/SOAP solution are also referred to as Web services because the WSDL/SOAP solution is applied to the Web.

The WSDL v1.1 protocol provides no method for implementing the IS level inheritance defined by the 3GPP IS level description in the WSDL/SOAP solution, so how to establish the IS level inheritance between the inheriting IRP and the base IRP using the WSDL v1.1 protocol has become a pressing issue.

One existing solution includes: establishing the IS level inheritance between the inheriting IRP and the ManagedGenericIRP using the import mechanism defined by the WSDL protocol when a WSDL file is defined. Referring to FIG. 4, this solution is as follows.

Block 401: Define a WSDL file for ManagedGenericIRP. The WSDL file for ManagedGenericIRP includes Types, Message, portType, Binding and Service. The Types and Message are used for defining management data and message. The portType, Binding and Service are used for defining management operations, ports and services. The management operations of ManagedGenericIRP include: getIRPVersion, getOperationProfile and getNotificationProfile. In a WSDL file, ManagedGenericIRP is called GenericIRP for short.

Block 402: Define a WSDL file for an inheriting IRP. The WSDL file for the inheriting IRP includes Types, Message, portType, Binding and Service. For different inheriting IRPs, the management operations, ports and services defined via portType, Binding and Service may be different. To distinguish from the base management operations defined in ManagedGenericIRP, the management operations defined in the inheriting IRP are referred to as the specific management operations.

For example, when the inheriting IRP is BasicCMIRP, the specific management operations defined via portType, Binding and Service include: getMOAttributes, getContainment, cancelOperation, createMO, deleteMO and setMOAttributes.

Block 403: Establish an IS level inheritance between the inheriting IRP and the base IRP by importing the WSDL file for ManagedGenericIRP into the WSDL file for the inheriting IRP using an import mechanism.

After the IS level inheritance is established using the import mechanism, the management operations (Operations) included in the WSDL file for BasicCMIRP are as shown in FIG. 5. The getMOAttributes, getContainment, cancelOperation, createMO, deleteMO and setMOAttributes are the specific management operations bound to the BasicCMIRP service; while the getIRPVersion, getOperationProfile and getNotificationProfile are the base management operations bound to the GenericIRP service.

A managing unit sends a request to a managed unit to instruct the managed unit to implement a base management operation of the inheriting IRP based on the established IS level inheritance. The processing procedure is as follows.

First, the managing unit employs a BasicCMIRP module to generate a base management operation request for BasicCMIRP, and sends the base management operation request to a SOAP interface module of the managing unit.

Second, the SOAP interface module of the managing unit finds the WSDL file for the inheriting IRP according to the inheriting IRP corresponding to the base management operation request. Because the WSDL file for the inheriting IRP records two services corresponding to two ports, i.e. the service of the BasicCMIRP port and the service of port imported from the WSDL file for ManagedGenericIRP, the SOAP interface module of managing unit may not know how to select the right service to serialize the base management operation request of BasicCMIRP.

If the ManagedGenericIRP service is selected, the SOAP interface module will serialize the base management operation request into a SOAP format message of ManagedGenericIRP module, and send the SOAP format message of ManagedGenericIRP module over a Web network.

If the service of the inheriting IRP port is selected, the SOAP interface module will serialize the base management operation request into a SOAP format message of BasicCMIRP module, and send the SOAP format message of BasicCMIRP module over a Web network.

If the base management operation request is serialized into the SOAP format message of ManagedGenericIRP module, the SOAP port of managed unit will try to send the base management operation request to the address of ManagedGenericIRP service for processing in the subsequent procedure. Because ManagedGenericIRP is an abstract function and there is no address of ManagedGenericIRP service, the execution of the base management operation will fail.

If the base management operation request is serialized into the SOAP format message of BasicCMIRP module, the managed unit will send the base management operation request to the address of BasicCMIRP service for processing in the subsequent procedure. The address of BasicCMIRP service is directed to the BasicCMIRP module. Because BasicCMIRP includes no base management operation, the base management operation can not be executed.

That is to say, the SOAP format message sent by the Web network can not be un-serialized into the base management operation of managed unit that can be correctly executed based on the WSDL file for BasicCMIRP.

The above procedure may be described in detail by taking the BasicCMIRP as an example. Suppose that the request sent by the managing unit is a request for executing the getIRPVersion operation for the BasicCMIRP.

After the WLDL file for BasicCMIRP is defined according to the method in accordance with FIG. 4, if the request is for serializing the getIRPVersion operation into a SOAP format message of ManagedGenericIRP module according to the WSDL file, upon receiving the request, the managed unit will search the location of the ManagedGenericIRP service to execute the getIRPVersions operation. Because the ManagedGenericIRP is an abstract function and it is impossible to find the corresponding ManagedGenericIRP module, the execution of getIRPVersions operation will fail.

If the request is for serializing the getIRPVersion operation into a SOAP format message of BasicCMIRP according to the WSDL file defined in accordance with FIG. 4, upon receiving the request, the managed unit will find the location of the BasicCMIRP module and request the BasicCMIRP module to execute the getIRPVersions operation. Because the BasicCMIRP module includes no getIRPVersions operation, the request can not be executed.

The inventor of the present invention found in the inventing process that the IS level inheritance between the inheriting IRP and the base IRP can not be established correctly by the conventional method for implementing the IS level inheritance. And the inheriting IRP can not execute the base management operation defined by the base IRP, so the IS level description requirement of IRP can not be satisfied.

SUMMARY OF THE INVENTION

Embodiments of the present invention provide methods for implementing Information Service (IS) level inheritance in a network management system, by the methods, the inheriting Integration Reference Point (IRP) may correctly execute the base management operation defined by the base IRP.

The embodiments of the present invention provide network management apparatuses for implementing IS level inheritance as well, the inheriting IRP of the network management apparatuses may correctly execute the base management operation.

A method for implementing IS level inheritance in a network management system includes: defining a Web Services Description Language (WSDL) file for an inheriting IRP, including base management operations of a base IRP in the WSDL file for the inheriting IRP during the defining action to establish an IS level inheritance between the inheriting IRP and the base IRP; implementing conversion between a base management operation message and a SOAP format message according to the IS level inheritance.

A method for implementing IS level inheritance in a network management system includes: defining a WSDL file for an inheriting IRP, including base management operations of a base IRP in the WSDL file for the inheriting IRP during the defining action to establish an IS level inheritance between the inheriting IRP and the base IRP; sending, by an inheriting IRP module of a network management apparatus, a base management operation message to a SOAP interface module of the network management apparatus; serializing, by the SOAP interface module of the network management apparatus, the base management operation message into a SOAP format message of the inheriting IRP module according to the IS level inheritance established in the WSDL file for the inheriting IRP.

A method for implementing IS level inheritance in a network management system includes: defining a WSDL file for an inheriting IRP, including base management operations of a base IRP in the WSDL file for the inheriting IRP during the defining action to establish an IS level inheritance between the inheriting IRP and the base IRP; un-serializing, by an SOAP interface module of a network management apparatus, a SOAP format message into a base management operation message of an inheriting IRP module of the network management apparatus according to the IS level inheritance established in the WSDL file for the inheriting IRP upon receiving the SOAP format message sent by an external entity, and sending the base management operation message to the inheriting IRP module of the network management apparatus.

A network management apparatus for implementing IS level inheritance in a network management system includes: an inheriting IRP module and a SOAP interface module, the SOAP interface module is configured to save a WSDL file for an inheriting IRP, wherein the WSDL file establishes an IS level inheritance between the inheriting IRP and a base IRP by including the base management operations of the base IRP in the WSDL file; and the SOAP interface module is also configured to implement conversion between a SOAP format message and a base management operation message associated with the inheriting IRP module according to the IS level inheritance.

Another network management apparatus for implementing IS level inheritance in a network management system includes: an inheriting IRP module and a SOAP interface module; the SOAP interface module is configured to save a WSDL file for an inheriting IRP, wherein the WSDL file establishes an IS level inheritance between the inheriting IRP and a base IRP by including the base management operations of the base IRP in the WSDL file; the SOAP interface module is also configured to serialize a base management operation message sent by the inheriting IRP module into a SOAP format message of the inheriting IRP module according to the IS level inheritance established in the WSDL file.

Another network management apparatus for implementing IS level inheritance in a network management system includes: an inheriting IRP module and a SOAP interface module; the SOAP interface module is configured to save a WSDL file for an inheriting IRP, wherein the WSDL file establishes an IS level inheritance between the inheriting IRP and a base IRP by including the base management operations of the base IRP; un-serialize a SOAP format message received from an external entity into a base management operation message according to the IS level inheritance established in the WSDL file, and send the base management operation message to the inheriting IRP module.

As can be seen from the above solution, the method and the network management apparatus for implementing the IS level inheritance in a network management system in accordance with the embodiments of the present invention directly binds the base management operations of the base IRP to the inheriting IRP service when defining a WSDL file for the inheriting IRP to establish the IS level inheritance between the inheriting IRP and the base IRP; the network management apparatus serializes or un-serializes the base management operation message according to the IS level inheritance established in the WSDL file, which makes it possible to correctly execute the base management operation, thereby meeting the IS level description requirement of the IRP.

DETAILED DESCRIPTION OF THE INVENTION

This invention is hereinafter described in detail with reference to the accompanying drawings as well as embodiments to make the technical solution and merits thereof more apparent.

Figure 1:
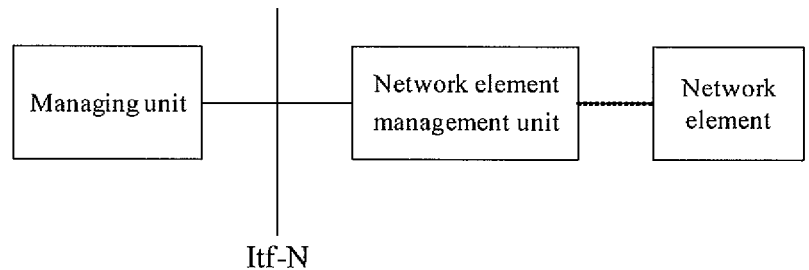
FIG. 1 is a simplified schematic diagram illustrating an Itf-N between a managing unit and a network element management unit in the existing art.
Figure 2:
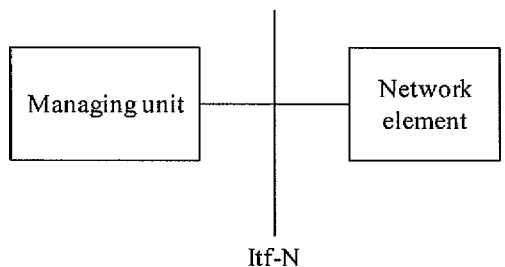
FIG. 2 is a simplified schematic diagram illustrating an Itf-N between a managing unit and a network element in the existing art.
Figure 3:
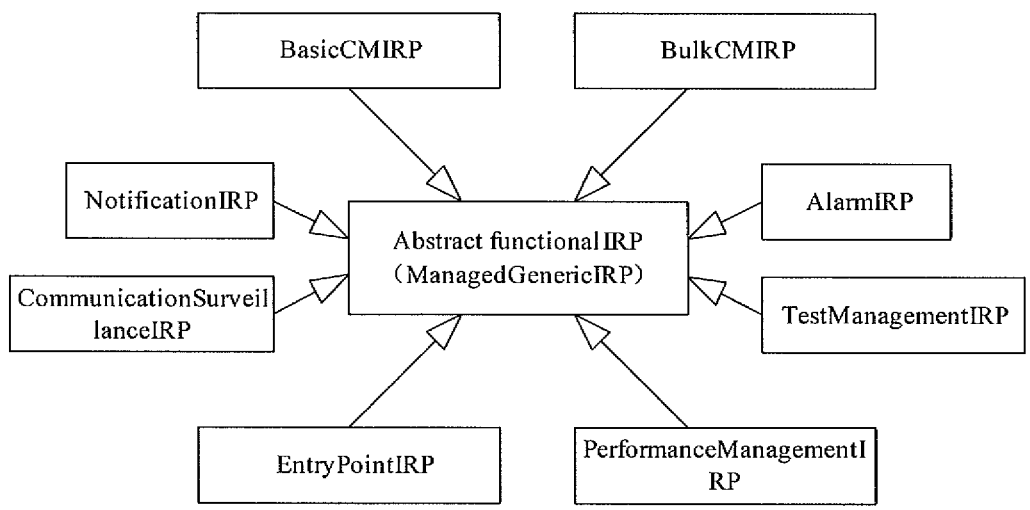
FIG. 3 is a simplified schematic diagram illustrating the IS level inheritance in the existing art.
Figure 4:
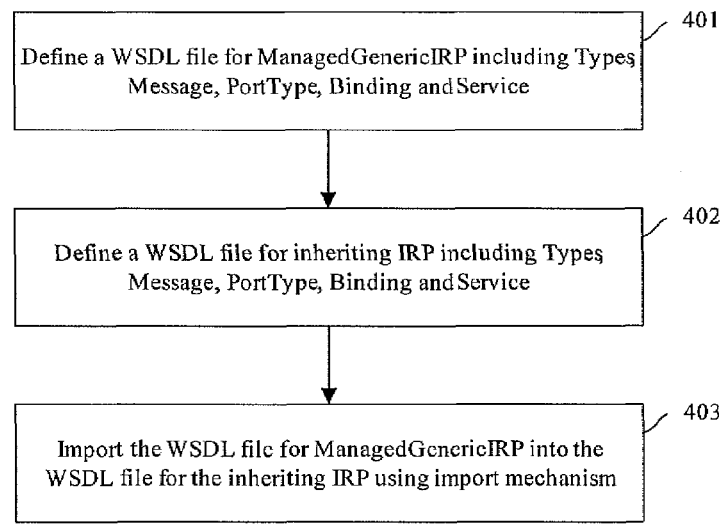
FIG. 4 is a simplified flowchart for establishing the IS level inheritance between an inheriting IRP and a ManagedGenericIRP in the existing art.
Figure 5:
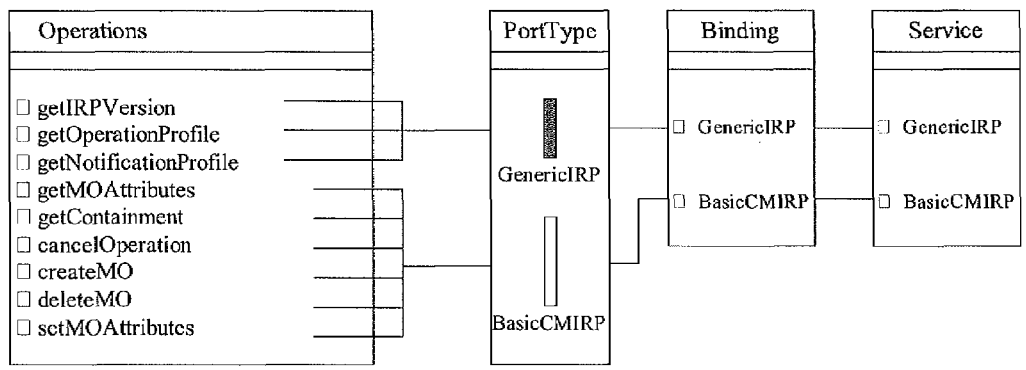
FIG. 5 is a simplified schematic diagram for defining management operations in a WSDL file for a BasicCMIRP in the existing art.
Figure 6:
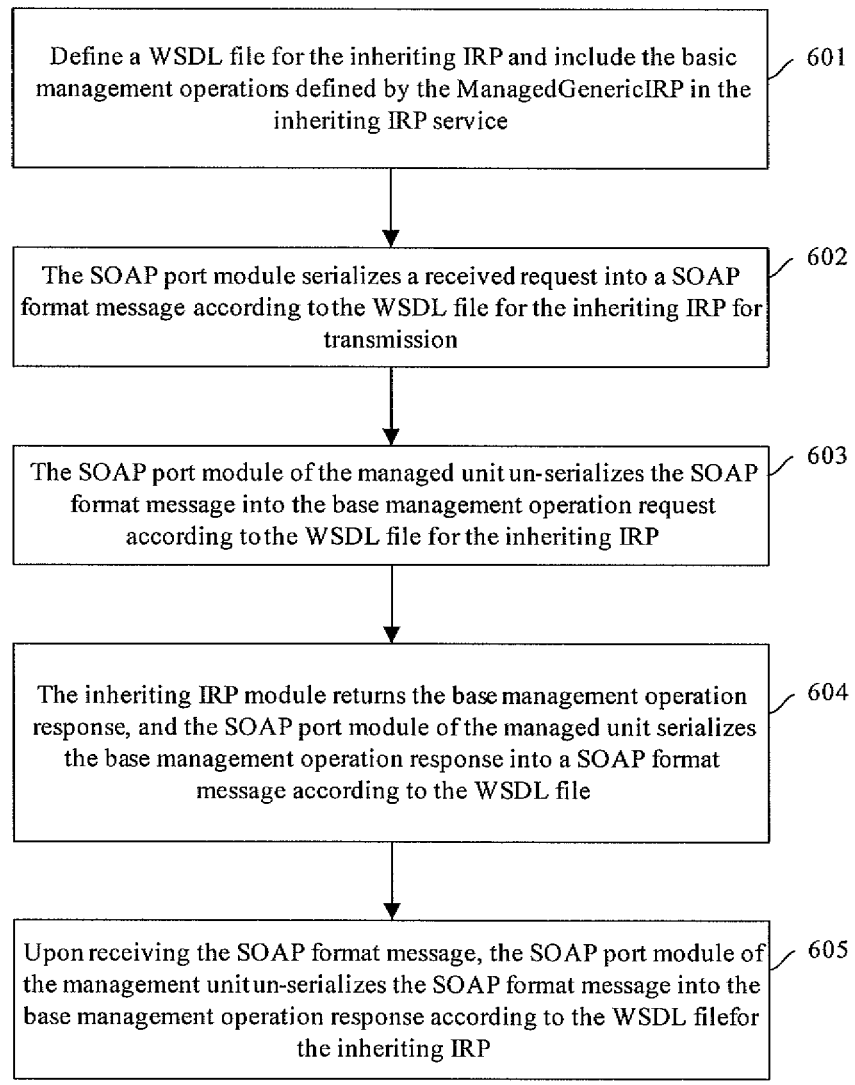
FIG. 6 is a simplified flowchart for implementing the IS level inheritance between an inheriting IRP and a ManagedGenericIRP in accordance with an embodiment of the present invention.

In an embodiment of the present invention, IS level inheritance is established between an inheriting IRP and a ManagedGenericIRP so that the inheriting IRP can execute base management operations defined by the ManagedGenericIRP. The implementation of the IS level inheritance is as shown in FIG. 6.

Block 601: Define a WSDL file for the inheriting IRP and directly include the base management operations of the base IRP in the inheriting IRP service to establish the IS level inheritance between the inheriting IRP and the base IRP, and respectively save the defined WSDL file for the inheriting IRP in the SOAP interface modules of both the managing unit and the managed unit. Both the managing unit and the managed unit may be referred to as network management apparatuses.

In block 601, the defined WSDL file for the inheriting IRP includes: Types, Message, PortType, Binding and Service. The Types and Message defined of the WSDL file for the inheriting IRP includes definitions of Types and Message of the base IRP. The PortType of the inheriting IRP WSDL file include the base management operations of ManagedGenericIRP and specific management operations of the inheriting IRP. The PortType above is used to define Binding, which in turn is used to define Service. Management operations defined in both base IRP and inheriting IRP are all bound to the inheriting IRP service of the WSDL file for the inheriting IRP.

The inheriting IRP may establish the IS level inheritance with one or more base IRPs which may include an abstract function IRP or an instantiable IRP. For example, the method for defining a WSDL file for the inheriting IRP includes:

defining the Types and the Message of the WSDL file for the inheriting IRP which respectively includes the definitions of Types and Message of the base IRP; defining the PortType of the WSDL file for the inheriting IRP, and directly including the base IRP management operations in the PortType of the WSDL file for the inheriting IRP so that the PortType of the inheriting IRP WSDL file include the base management operations of ManagedGenericIRP and specific management operations of the inheriting IRP; defining Binding of the WSDL file for the inheriting IRP based on the PortType of the WSDL file for the inheriting IRP, and defining Service of the WSDL file for the inheriting IRP based on the Binding of the WSDL file for the inheriting IRP.

In this method, the base IRP above may be an inheriting IRP which inherits from another base IRP. For example, in a first inheriting definition, A is an inheriting IRP, B and C are the base IRPs of A, and A inherits B and C; in a second inheriting definition, D is an inheriting IRP, the A in the first inheriting definition is the base IRP of D defined in the second inheriting definition, i.e. D inherits A.

Figure 7:
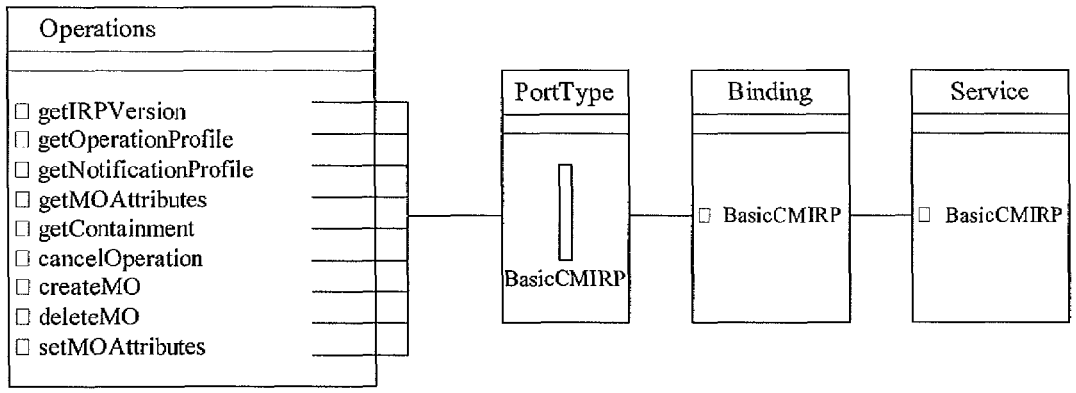
FIG. 7 is a simplified schematic diagram for defining management operations in a WSDL file for a BasicCMIRP in accordance with an embodiment of the present invention.

Referring to FIG. 7, taking BasicCMIRP as an example, the management operations included in the WSDL file for BasicCMIRP listed as follows: getMOAttributes, getContainment, cancelOperation, createMO, deleteMO, setMOAttributes, getIRPVersion, getOperationProfile and getNotificationProfile; these management operations are directly bound to the BasicCMIRP service. The getIRPVersion, get- OperationProfile and getNotificationProfile are the same as the base management operations defined in the ManagedGenericIRP, i.e. the BasicCMIRP includes the base management operations defined in the ManagedGenericIRP.

In this method, the base IRP may be any function IRP, i.e. the management operations of the function IRP may be defined as required, and the inheriting IRP which establishes the IS level inheritance with the base IRP is the upgraded version of the base IRP.

Block 602: An inheriting IRP module of the managing unit generates a base management operation request for the inheriting IRP and sends the base management operation request to a SOAP interface module of the managing unit; the SOAP interface module of the managing unit serializes the base management operation request into a SOAP format message of the inheriting IRP module based on the IS level inheritance established in the WSDL file for the inheriting IRP, and sends the SOAP format message to the Web network.

Block 603: Upon receiving the SOAP format message sent by the Web network, the SOAP interface module of the managed unit un-serializes the SOAP format message into the base management operation request of the inheriting IRP module based on the IS level inheritance established in the WSDL file for the inheriting IRP.

Considering the different specific functions, the inheriting IRP module of the managing unit may be referred to as an inheriting IRP manager module and the inheriting IRP module of the managed unit may be referred to as an inheriting IRP implementation module for distinction.

Block 604: The inheriting IRP module of the managed unit executes the base management operation request and sends the execution result to the SOAP interface module of the managed unit via a base management operation response; the SOAP interface module of the managed unit serializes the base management operation response into the SOAP format message of the inheriting IRP module based on the IS level inheritance established in the WSDL file for the inheriting IRP, and sends the SOAP format message to the Web network.

Block 605: Upon receiving the SOAP format message sent by the Web network, the SOAP interface module of the managing unit un-serializes the SOAP format message into the base management operation response of the inheriting IRP module based on the IS level inheritance established in the WSDL file for the inheriting IRP.

For convenience, if the base management operation request sent in Block 603 is the base management operation request received in Block 604 in the above descriptions, Blocks 602-603 and Blocks 604-605 are executed synchronously in this embodiment. In one embodiment, the managing unit and the managed unit may work asynchronously, i.e. the operations of two units are independent. In this case, Blocks 602-603 and Blocks 604-605 are not executed synchronously. Besides, both the base management operation request and the base management operation response processed by the SOAP interface module may be referred to as the base management operation message.

Take the BasicCMIRP as an example, if the base management operation request sent by the managing unit is a getIRPVersion operation request, the response returned in Block 605 will be the BasicCMIRP version information. The procedure for executing other base management operations included in the BasicCMIRP is similar, which will not be detailed here.

The method of this embodiment is also applicable to other inheriting IRPs, for example BasicCMIRP, BulkCMIRP, NotificationIRP, TestManagementIRP, PerformanceManagementIRP, EntryPointIRP, CommunicationSurveillanceIRP, AlarmIRP, NotificationLogIRP, FileTransferIRP and SubscriptionManagementIRP.

Figure 8:
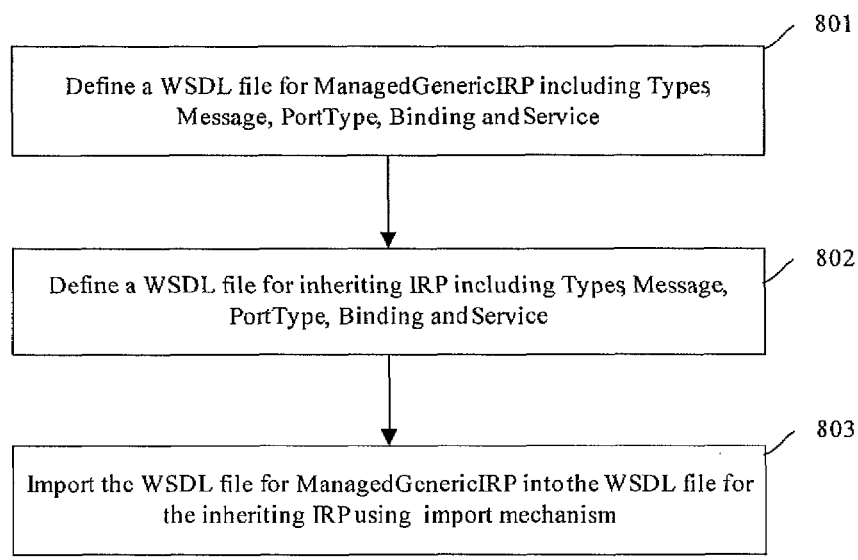
FIG. 8 is a simplified flowchart for defining a WSDL file for an inheriting IRP in accordance with an embodiment of the present invention.

In another embodiment of the present invention, the method for defining a WSDL file for an inheriting IRP is as shown in FIG. 8.

Block 801: Define a WSDL file for a ManagedGenericIRP. The WSDL file for the ManagedGenericIRP includes Types and Message.

Block 802: Define a WSDL file for an inheriting IRP. The WSDL file for the inheriting IRP includes PortType, Binding and Service. Management operations defined by the PortType include base management operations of ManagedGenericIRP and specific management operations of the inheriting IRP, and the PortType is used to define Binding, which in turn is used to define Service.

For example, when the inheriting IRP is a BasicCMIRP, the management operations include: getMOAttributes, getContainment, cancelOperation, createMO, deleteMO, setMOAttributes, getIRPVersion, getOperationProfile and getNotificationProfile; these operations are included in one portType which is used to define Binding, and the Binding is bound to the BasicCMIRP service.

Block 803: Import the WSDL file for ManagedGenericIRP into the WSDL file for the inheriting IRP.

The existing art such as the import mechanism defined in the WSDL protocol may be used to import the WSDL file for ManagedGenericIRP into the WSDL file for the inheriting IRP in block 803.

Because an inheriting IRP may correspond to multiple base IRPs and an inheriting IRP may inherit a base IRP which inherits another base IRP, an alternative method for defining the WSDL file for the inheriting IRP in this embodiment includes:

determining at least one base IRP for the inheriting IRP, and defining the Types and Message of the base IRP in the WSDL of the base IRP; defining the Types, Message, PortType, Binding and Service in the WSDL file for the inheriting IRP: including the base IRP management operations in the PortType of the WSDL file for the inheriting IRP; defining the Binding of the WSDL file for the inheriting IRP based on the PortType which includes the base IRP management operations and the inheriting IRP management operations, and defining the Service of the WSDL file for the inheriting IRP based on the Binding of the WSDL file for the inheriting IRP; importing the WSDL file for the base IRP into the WSDL file for the inheriting IRP.

After the WSDL file as shown in FIG. 8 is defined, the procedure for executing the base management operations defined by the ManagedGenericIRP by the inheriting IRP according to the WSDL file is similar to the former embodiment.

An embodiment of the present invention provides a network management apparatus for implementing information service level inheritance. The network management apparatus can be applied in a network management system with WSDL/SOAP solution. The network management apparatus includes a SOAP interface module and an inheriting IRP module;

the SOAP interface module saves a WSDL file for the inheriting IRP, and the WSDL file establishes the IS level inheritance between the inheriting IRP and the base IRP by including the base management operations of the base IRP;

the inheriting IRP module sends a base management operation message to a SOAP interface module; the SOAP interface module serializes the base management operation message into a SOAP format message of the inheriting IRP module for transmission based on the IS level inheritance established in the Web service description file saved by itself;

the SOAP interface module un-serializes a SOAP format message into a base management operation message of the inheriting IRP module, upon receiving the SOAP format message sent by an external entity, based on the IS level inheritance established in the Web service description file, and sends the base management operation message to the inheriting IRP module.

If the network management apparatus is a managing unit of the network management system, the inheriting IRP module of the managing unit generates a base management operation request, and sends the base management operation request to the SOAP interface module. The SOAP interface module serializes the base management operation request into a SOAP format message for transmission; or, the SOAP interface module of the managing unit executes the serialization, upon receiving the SOAP format message sent by an external entity, and generates correspondingly a base management operation response and sends the base management operation response to the inheriting IRP module.

Similarly, if the network management apparatus is a managed unit in the network management system, the SOAP interface module of the managed unit executes the un-serialization upon receiving the SOAP format message sent by the external entity, and generates correspondingly a base management operation request and sends the base management operation request to the inheriting IRP module; or, the inheriting IRP module of the managed unit generates a corresponding base management operation response upon executing a base management operation, and sends the response to the SOAP interface module. The SOAP interface module serializes the response into a SOAP format message for transmission.

The action for executing a certain base management operation by the managed unit may be triggered by a base management operation request of the managing unit.

The method and the apparatus in accordance with the embodiments of the present invention are applicable to the 3GPP system and the systems with the network management requirement such as the WIMAX or NGN system.

As can be seen from the above embodiments, the method and the network management apparatus for implementing the IS level inheritance in a network management system in accordance with the embodiments of the present invention binds the base management operations of the ManagedGenericIRP to the inheriting IRP service to establish the IS level inheritance between the inheriting IRP and the ManagedGenericIRP, so the inheriting IRP may correctly execute the base management operations of the base IRP, and the IS level description requirement of the IRP may be satisfied.

It is apparent that various modifications and variations may be made to the present invention by those skilled in the art, without departing from the spirit and the scope of the present invention. The present invention tends to cover the modifications and variations if those modifications and variations fall into the protected scope of the present invention defined by the accompanied claims or their equivalent.

I claim:

1. A method for a network managing apparatus to implement a management operation on a network managed apparatus, wherein the method comprises:

storing, by the network managing apparatus, a Web Services Description Language (WSDL) file for an inheriting Integration Reference Point (IRP); wherein the WSDL file for the inheriting IRP comprises: only one PortType of the WSDL file defined for the inheriting IRP, which includes base management operations of a base IRP and inheriting management operations of the inheriting IRP;

one Binding of the WSDL file defined for the inheriting IRP based on the defined one PortType; and one Service of the WSDL file defined for the inheriting IRP based on the defined one Binding;

generating, by the network managing apparatus, a base management operation message indicating at least one of the base management operations; serializing, by the network managing apparatus, the base management operation message into a SOAP format message of the inheriting IRP according to the WSDL file for the inheriting IRP;

sending, by the network managing apparatus, the SOAP format message of the inheriting IRP to the network managed apparatus.

2. The method of claim 1, wherein the WSDL file for the inheriting IRP further comprises:

Types and Messages for the inheriting IRP, wherein Types and Messages of the base IRP are included in the Types and Messages of the WSDL file for the inheriting IRP respectively.

3. The method of claim 1, wherein the WSDL file for the inheriting IRP further comprises:

Types and Messages of the WSDL file for the inheriting IRP; and a WSDL file for the base IRP, in which Types and Messages are defined, is imported into the WSDL file for the inheriting IRP.

4. The method of claim 1, wherein the inheriting IRP comprises at least one of: BasicCMIRP, BuIkCMIRP, NotificationIRP, TestManagementIRP, PerformanceManagement IRP, CommunicationSurveillanceIRP, EntryPointIRP, AlarmIRP, NotificationLogIRP, FileTransferIRP and SubscriptionManagementIRP.

5. The method of claim 1, wherein the base management operations of the base IRP comprises at least one of: getIRPVersion, getOperationProfile and getNotificationProfile.

6. The method of claim 1, wherein the base IRP is a function IRP, and the inheriting IRP is an upgraded version of the base IRP.

7. The method of claim 1, wherein:

the base management operation message is a base management operation request.

8. The method of claim 1, wherein the method further comprises:

receiving, by the network managing apparatus, a SOAP format message sent from the network managed apparatus;

un-serializing, by the network managing apparatus, the SOAP format message into a base management operation message of the inheriting IRP according to the WSDL file for the inheriting IRP; and processing, by the network managing apparatus, the base management operation message.

9. The method of claim 1, wherein the managed apparatus is one of a network element management apparatus and a network element.

10. A method for a network managed apparatus to implement a network management operation from a network managing apparatus, wherein the method comprises:

storing, by the network managed apparatus, a Web Services Description Language (WSDL) file for an inheriting Integration Reference Point (IRP);

wherein the WSDL file for the inheriting IRP comprises: only one PortType of the WSDL file defined for the inheriting IRP, which includes base management operations of a base IRP and inheriting management operations of the inheriting IRP;

one Binding of the WSDL file defined for the inheriting IRP based on the defined one PortType; and one Service of the WSDL file defined for the inheriting IRP based on the defined one Binding;

receiving, by the network managed apparatus, a SOAP format message sent from the network managing apparatus;

un-serializing, by the network managed apparatus, the SOAP format message into a base management operation message of the inheriting IRP according to the WSDL file for the inheriting IRP; and processing, by the network managed apparatus, the base management operation message.

11. The method of claim 10, wherein the base management operation message is a base management operation request.

12. The method of claim 11, wherein the method further comprises:

generating, by the network managed apparatus, a base management operation response;

serializing, by the network managed apparatus, the base management operation response into a SOAP format message of the inheriting IRP; and sending, by the network managed apparatus, the SOAP format message to the network managing apparatus.

13. A network managing apparatus for implementing a network management operation on a network managed apparatus, comprising: a first inheriting Integration Reference Point (IRP) module and a first SOAP interface module, wherein:

the first SOAP interface module is configured to store a Web Services Description Language (WSDL) file for an inheriting IRP;

wherein the WSDL file for the inheriting IRP comprises: only one PortType of the WSDL file defined for the inheriting IRP, which includes base IRP management operations of a base IRP and inheriting IRP management operations; one Binding of the WSDL file defined for the inheriting IRP based on the defined one PortType; and one Service of the WSDL file defined for the inheriting IRP based on the defined one Binding;

the first inheriting IRP module is congiured to generate a base management operation message indicating at least one of the base management operations;

the first SOAP interface module is further configured to serialize the base management operation message into a SOAP format message of the inheriting IRP according to the WSDL file for the inheriting IRP, and configured to send the SOAP format message of the inheriting IRP to the network managed apparatus.

14. A network managed apparatus for implementing a network management operation from a network managing apparatus, comprising: a second inheriting Integration Reference Point (IRP) module and a second SOAP interface module, wherein:

the second SOAP interface module is configured to store a Web Services Description Language (WSDL) file for an inheriting IRP;

wherein the WSDL file for the inheriting IRP comprises: only one PortType of the WSDL file defined for the inheriting IRP, which includes base IRP management operations of a base IRP and inheriting IRP management operations; one Binding of the WSDL file defined for the inheriting IRP based on the defined one PortType; and one Service of the WSDL file defined for the inheriting IRP based on the defined one Binding;

the second SOAP interface module is further configured to receive a SOAP format message sent from the network managing apparatus; to un-serialize, the SOAP format message into a base management operation message of the inheriting IRP, according to the WSDL file for the inheriting IRP;

and the second inheriting IPR module, is further configured to process the base management operation message.

* * * * *